United States Patent [19]

Mattson et al.

[11] Patent Number: 5,303,148
[45] Date of Patent: Apr. 12, 1994

[54] VOICE ACTUATED VOLUME IMAGE CONTROLLER AND DISPLAY CONTROLLER

[75] Inventors: Rodney A. Mattson, Mentor; Todd J. Krochta, Copley; Heang K. Tuy, Chesterland, all of Ohio

[73] Assignee: Picker International, Inc., Highland Hts., Ohio

[21] Appl. No.: 605,372

[22] Filed: Oct. 30, 1990

Related U.S. Application Data

[63] Continuation-in-part of Ser. No. 391,484, Aug. 9, 1989, Pat. No. 5,079,699, which is a continuation-in-part of Ser. No. 200,697, May 31, 1988, abandoned, which is a continuation-in-part of Ser. No. 126,368, Nov. 27, 1987, abandoned.

[51] Int. Cl.⁵ .............................. G06F 15/40
[52] U.S. Cl. .................... 364/413.01; 364/413.22; 381/43
[58] Field of Search ............ 381/41, 42, 43, 110, 381/49; 395/2, 11; 364/419, 413.01, 413.02

[56] References Cited

U.S. PATENT DOCUMENTS

| | | | |
|---|---|---|---|
| 4,677,569 | 6/1987 | Nakano et al. | 395/2 |
| 4,700,322 | 10/1987 | Benbassat et al. | 364/513.5 |
| 4,731,725 | 3/1988 | Suto et al. | 395/11 |
| 4,737,912 | 4/1988 | Ichikawa | 364/413.01 |
| 4,776,016 | 10/1988 | Hansen | 381/42 |
| 4,817,050 | 3/1989 | Komatsu et al. | 364/900 |
| 4,879,665 | 11/1989 | Akatsuka | 364/413.02 |
| 4,907,274 | 3/1990 | Nomura et al. | 380/30 |
| 4,945,410 | 10/1988 | Walling | 358/141 |
| 4,989,253 | 1/1991 | Laing et al. | 381/110 |
| 5,040,213 | 8/1991 | Bethards | 381/41 |
| 5,051,924 | 9/1991 | Bergeron et al. | 595/2 |
| 5,054,082 | 10/1991 | Smith et al. | 381/42 |
| 5,168,548 | 12/1992 | Kaufman | 345/2 |

Primary Examiner—Robert A. Weinhardt
Assistant Examiner—A. Bodenoorf
Attorney, Agent, or Firm—Fay, Sharpe, Beall, Fagan, Minnich & McKee

[57] ABSTRACT

During surgery, a physician speaks commands that are received by a microphone (10). A speech processor (12) converts audio signals from the microphone into word signals. A command interpreter (14) compares each word signal with a list of previously authorized command words. When the word signal corresponds to one of the preselected command words, a corresponding command signal is generated and sent to a volume imager (18), a video recorder (20), a hard copy, printer (28), or other system component. The volume imager generates an image representation signal indicative of a portion of image data stored therein which is displayed on a video monitor (B) or recorded on the video recorder.

20 Claims, 3 Drawing Sheets

VOICE ACTUATED VOLUME IMAGE CONTROLLER AND DISPLAY CONTROLLER

This application is a continuation-in-part of patent application Ser. No. 391,484, filed Aug. 9, 1989, now U.S. Pat. No. 5,079,699 which in turn is a continuation-in-part of U.S. Pat. No. 200,697, filed May 31, 1988, now abandoned, which in turn is a continuation-in-part of U.S. Pat. No. 126,368, filed Nov. 27, 1987, now abandoned.

BACKGROUND OF THE INVENTION

The present invention relates to the art of medical diagnostics. It finds particular application in conjunction with the display and processing of non-invasive image data, such as MRI, CT, and analogous images and will be described with particular reference thereto.

Electronic medical diagnostic information is often collected in three dimensions. For example, a series of contiguous planar CT or MRI images may be collected and stored as volume image data in a three dimensional or triply subscripted memory. Other imaging techniques, such as spiral CT scanning, PET scanning, and the like, may also be utilized to generate three dimensional information.

Various cutting planes and cutting surfaces may be defined through the three dimensional volume and corresponding data accessed in order to generate images of selected regions within the volume. The images can represent three dimensional projection of the imaged volume with selected regions removed, slices or surfaces through the volume, or the like. Among other purposes, these selectable images are conveniently displayed during surgery. As the surgery progresses, it is advantageous for the surgeon to be able to look progressively deeper into the volume undergoing surgery to ascertain each layer of underlying structure and tissue.

However, the keyboard or other control panels for controlling the display of the selective images from the three dimensional image data are not readily amenable to sterilization. If the surgeon is to control the exact views which are displayed, the surgeon must touch the keyboard compromising the sterile condition of his surgical gloves, necessitating re-sterilization or the application of a new pair of sterile gloves.

Medical diagnostic images can be less than perfect for any one of a wide variety of reasons. Various filters have been developed to compensate for various types of image degradation. However, the selection of the appropriate filter is conventionally made by a trained radiologist based on his experience and the nature of the defects in the viewed image. It is often necessary for even the trained radiologist to try several different filters in order to optimize the image. Moreover, many of the correction or filter algorithms have selectable weighting controls which affect how much correction or filtering is performed. The selection of such weighting or analogous functions is again operator selected and optimized by trial and error.

Often, the CT and MRI images are evaluated by radiologists. Many of the radiologists started their careers evaluating x-ray exposed photographic film. The computer control of image planes, filters, and the like can be intimidating and can slow the image data evaluation process. Moreover, in order for the radiologist's evaluation to be usable by other doctors, it is commonly recorded on a physical medium, such as recording tape, or handwritten or typed on paper. Typed or printed text is easiest for another physician to read and evaluate. Audio recordings are easiest for evaluating radiologists, as well as the operating surgeon, to make.

The present invention provides a user friendly diagnostic image display and evaluation recordation system that is conveniently utilized by radiologists, surgeons, and others.

SUMMARY OF THE INVENTION

In accordance with one aspect of the present invention, a set of image data representing a three dimensional volume of a patient is stored in the image memory of a volume imaging apparatus. The volume imaging apparatus responds to preselected electronic commands to display any selected slice through the volume, to display a perspective of the imaged volume, with or without some of the data removed, and the like. A speech processor synthesizes a user's speech pattern and derives corresponding text. A command interpreter receives the text and determines corresponding commands to feed to a system manager which controls the volume imager accordingly. That is, the command interpreter translates the text or command words as processed by the speech processor into the electronic control signals that heretofore have been produced by an operator keyboard or the like. The data from the volume imager selected by the commands is transferred to a video device, such as a video recorder or video display terminal or both. In response to the verbal commands, one or more images is called up from the volume imager for display and one or more of the displayed images is recorded. In accordance with a more limited aspect of the present invention, the speech processor further processes vocalizations of the speaker into descriptive text, which text is displayable on the video display or recordable by the video recorder.

In accordance with a more limited aspect of the present invention, the speech processor is able to process the voice input either directly from the user through the microphone or indirectly from the playback of the voice recorder.

In accordance with a yet more limited aspect of the present invention, a hard copy print device is provided for printing a paper copy of a selected image and accompanying textual descriptions, analyses, or the like.

In accordance with yet another more limited aspect of the present invention, a voice synthesizer is provided such that the system can provide the operator with feed back information, instructions, and other information verbally.

One advantage of the present invention is that it is user friendly. It simplifies the use of diagnostic images by radiologists, surgeons, and others.

Another advantage of the present invention is that it enables each operator to instruct the system in his preferred or native language.

Another advantage of the present invention is that it provides for complete hands free control of video displays and for recording video and speech supplied information.

Yet another advantage of the present invention is that it provides written, hard copy, or paper records that are readily reviewed at a later time.

Still further advantages will become apparent by reading and understanding the following detailed description.

BRIEF DESCRIPTION OF THE DRAWINGS

The invention may take form in various components and arrangements of components and in various steps and arrangements and steps. The drawings are only for purposes of illustrating a preferred embodiment and are not to be construed as limiting the invention.

DETAILED DESCRIPTION OF THE PREFERRED EMBODIMENTS

Figure 1:
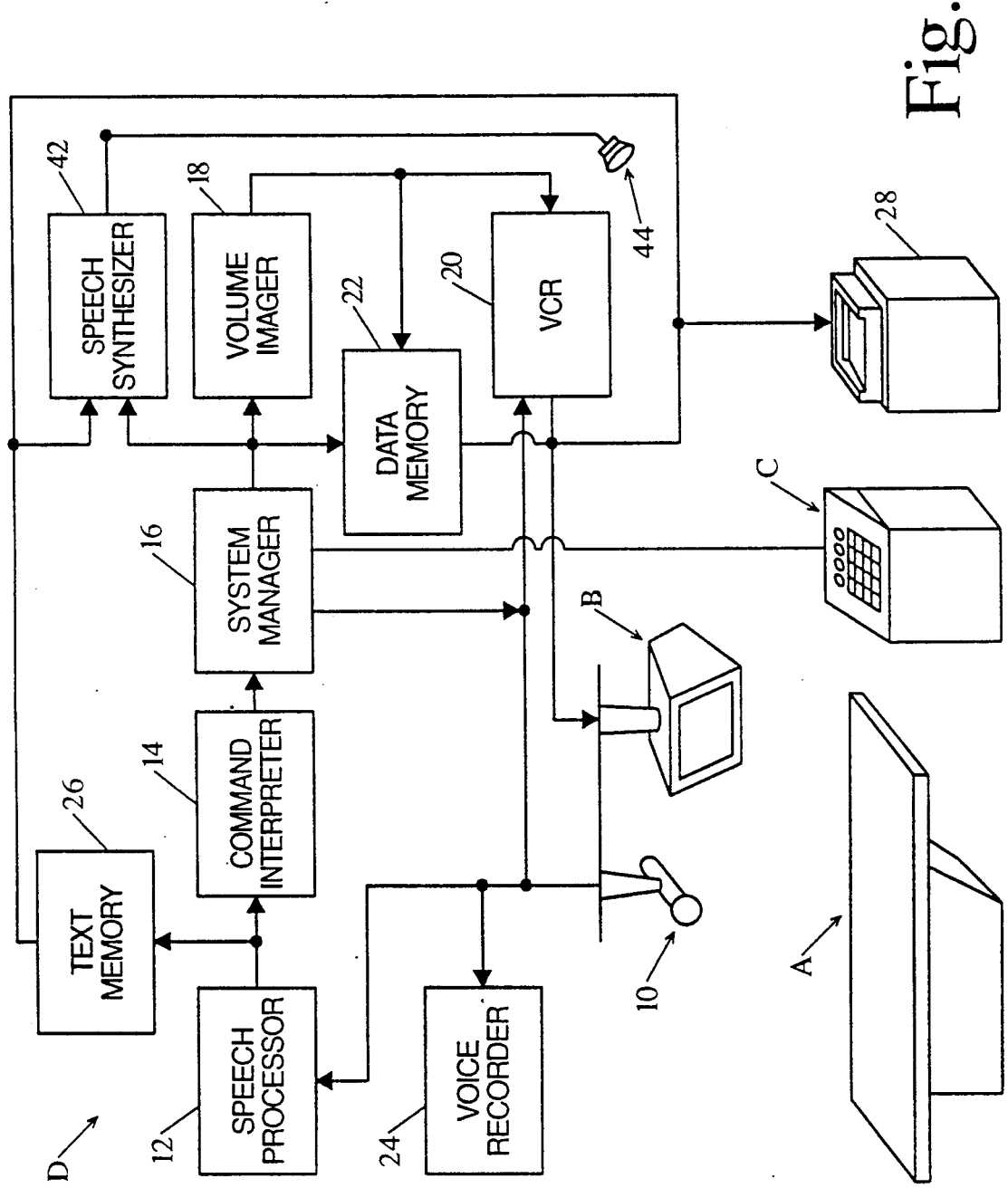
FIG. 1 is a diagrammatic illustration of the present invention.

With reference to FIG. 1, in an operating room environment, a surgeon commonly works adjacent a patient supporting surface A on which a patient is supported. A video monitor B selectively provides displays of pertinent information during surgery. These displays include pictures of selectable slices through a volumetric region of interest based on previously executed CT or MRI scans. This may also include images from other diagnostic examinations, such as shadowgraphic x-rays, PET scans, nuclear cameras, and the like. Further, the patient's medical history may be displayed in full or in part. Although the display on the monitor B may be controlled by a manual console C, a voice actuated control D is also provided.

The voice actuated control D includes a listening means 10 such as a microphone which receives the speaker's voice. A speech processor 12 analyzes the received audio signal and generates corresponding electronic words or text, as is known in the art. A command interpreter 14 compares each generated word or text with a list of preselected control commands or command words. The list of preselected control commands includes all or some of the commands which the operator had previously been able to enter on the keyboard C. In response to receiving each of the preselected command words, the command interpreter generates the same control signal that the keyboard c produces for the corresponding command. The control input signal is processed by the system manager 16 which is responsible for activating the appropriate response of the whole system.

A volume imager 18 includes a volume image memory which first stores the data that corresponds to an imaged volume of the patient. An appropriate volume imager in described in U.S. patent application Ser. No. 391,484, filed Aug. 9, 1989. Second, the volume imager includes an appropriate memory access means which responds to the received control signals to withdraw the elements of data corresponding to a selected slice or projection of the imaged volume. Third, the volume imager includes a video signal generating means for converting the selected image data into a video signal for display on the monitor B or for recordation on a video track of a video recorder 20.

The control signals are also conveyed to an other data memory means 22 for withdrawing other selected information and producing a data signal thereof. For example, the other data memory means 22 may include a patient medical history memory means which is a memory that stores the patient's medical history, reactions to drugs, and the like. Optionally, the other data memory means may store other images, such as a shadowgraphic projection x-ray image or the like. An appropriate memory control means responds the received command words or text withdraw. A video means converts the withdrawn data into an appropriate video signal to generate corresponding text or image display on the video monitor B either alone or in combination with the image from the volume imager 18.

The audio signal may also be conveyed directly to a voice recorder 24, preferably a voice actuated voice recorder. In this manner, observations and volume imager commands made by the physician during the medical procedure are recorded on the voice recorder. This recording can later be used as input to the speech processor. Alternately, the verbal observations may be recorded on the voice track of the video recorder 20. As yet another option, the system manager 16 may enable the speech processor and a text memory means 26 to transform the verbal observations to text or words and store words generated. In this manner, the physician's observations are converted from the spoken word to text. A hard copy printer 28 is connected with the text memory means 26, the volume imager 18, and the memory means 22 for selectively printing a hard copy, e.g. a printed page of selected text and images. The command interpreter 14 in response to command works from the speech processor 12 generates the command signals to the system manager 16 which activates the hard copy printer and selects among the various inputs. This page can then be placed in the patient's file jacket for convenient later reference.

Figure 2:
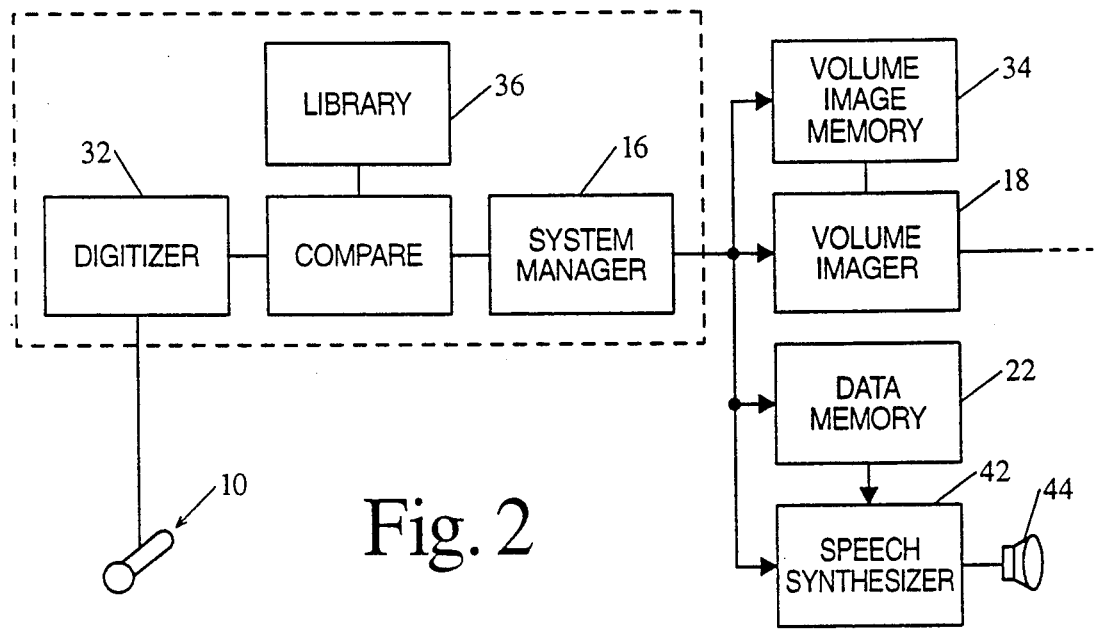
FIG. 2 is an alternate embodiment of the present invention that provides additional detail regarding multilingual operation.

With reference to FIG. 2, a speech processor 12 facilitates operation of the audio control system D in multiple languages. The speech processor includes a digitizing means 32 for digitizing received audio signals. A comparing means 34 compares the digitized audio signal or word with a library 36 of stored digital words. The library 36 includes a plurality of digitized word forms corresponding to each selectable command. More specifically, each digitized word form is stored in association with a corresponding command and a designated one of a plurality of designated language codes. To initialize the memory, each operator is shown each command and asked to vocalize an audio input corresponding thereto. Each operator speaks the word in the language that he will use to invoke a given command. Each operator may use a different language. A speech impaired person may use a series of non-word vocal sounds which he will use to designate each command. Each digital word or word pattern is stored in conjunction with the corresponding command code.

Each time an audible word is received and digitized, the comparing means 34 compares it to each digitized word in the library memory 36 and retrieves the corresponding command and language code. The system manager 16 processes the input command and evokes the appropriate response on the corresponding device such as the volume imaging means 18, the memory means 22, and the other system components. The language code is communicated to the system manager for controlling the volume imager or a speech synthesizer 42 to operate in one of a plurality of preselected languages. In this manner, although the operator is able to instruct the system in any language he chooses, the system will communicate audibly to the user in only one of preselected languages, e.g. English, French, German, Spanish, and Japanese.

The speech synthesizer 42 is connected with the memory means 22 to convert the words of the stored patient history into audible signals to be supplied to a speaker 44. Further, the command interpreter, the volume imager, the VCR and other system components communicate information to the display means B through the system manager to indicate the state of the system or request additional information or action. For example, the command interpreter may indicate that a command is not recognized. The volume imager may indicate that a series of commands is incomplete, that no valid command has been received, that a valid command has been received and that the system is processing, or the like. The VCR may indicate that the tape is rewinding, that no tape is present, and the like. This and other feedback information is communicated by the system components to the voice synthesizer. The voice synthesizer audiblizes text or word information, as well as word information components to machine signals, in the language designated by the language code.

The speech processor further converts audible sounds to corresponding text. The voice speech processor may be preprogrammed to operate in a plurality of languages, particularly languages that have analogous phonetics. Optionally, a plurality of speech processors may be provided, each keyed to a different language or group of languages. The language code from the comparing means 34 enables the speech processor for the language code corresponding to the last received command, which is taken as an indication of the language in which the most recent operator will be dictating observations.

Figure 3:
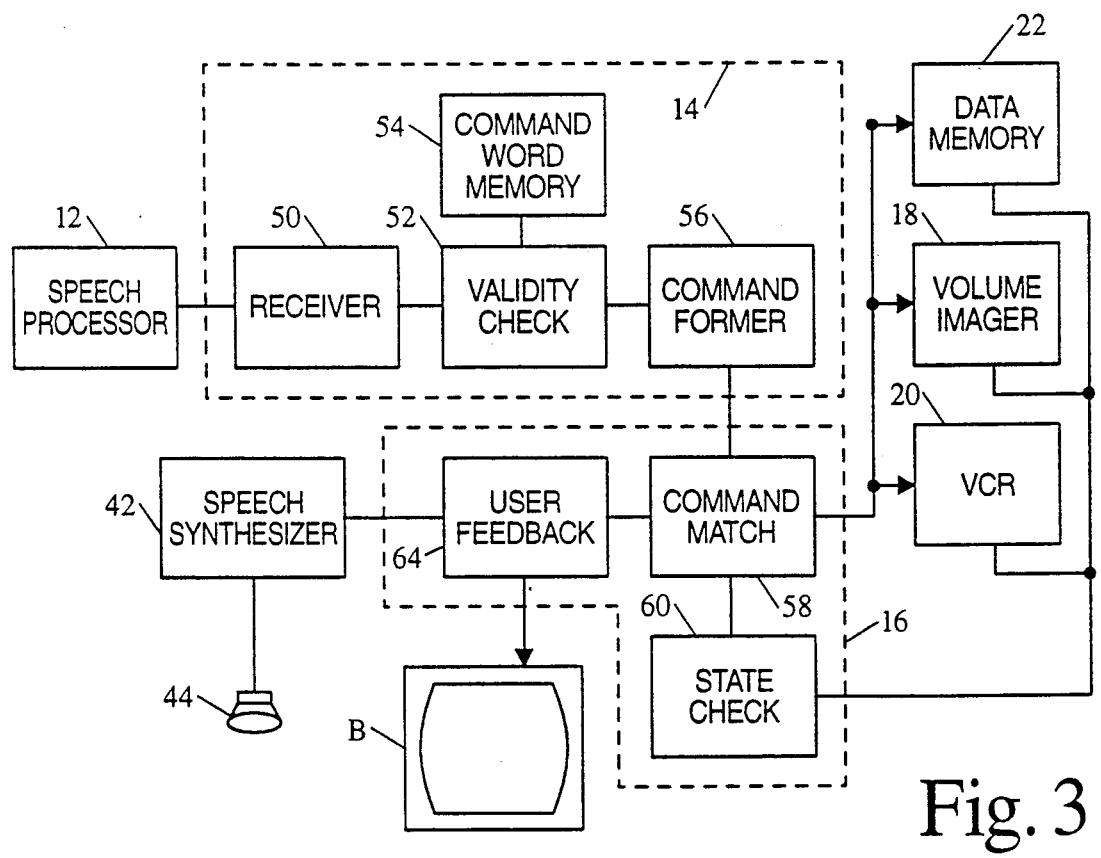
FIG. 3 expands the description of the command interpreter.

With reference to FIG. 3, command interpreter 14 includes a receiving means 50 for receiving an input word from the speech processor 12. A validity checking means 52 checks the validity of the input word against a list of preselected command words in a command word memory 54. A command forming means 56 forms the appropriate command code input to the system manager 16. A matching means $s matches the command with a valid command for the volume imager 18, the VCR 20, the memory means 22, the text means 26, or other audio controlled devices. A checking means 60 checks the correctness of the command for the current state of the system, including the current state of the volume imager 18, the memory means 22, the VCR 20, and the like. A user feed back means 64 provides the user with feed back regarding the received command through the speech synthesizer 42, or the video display B.

Figure 4:
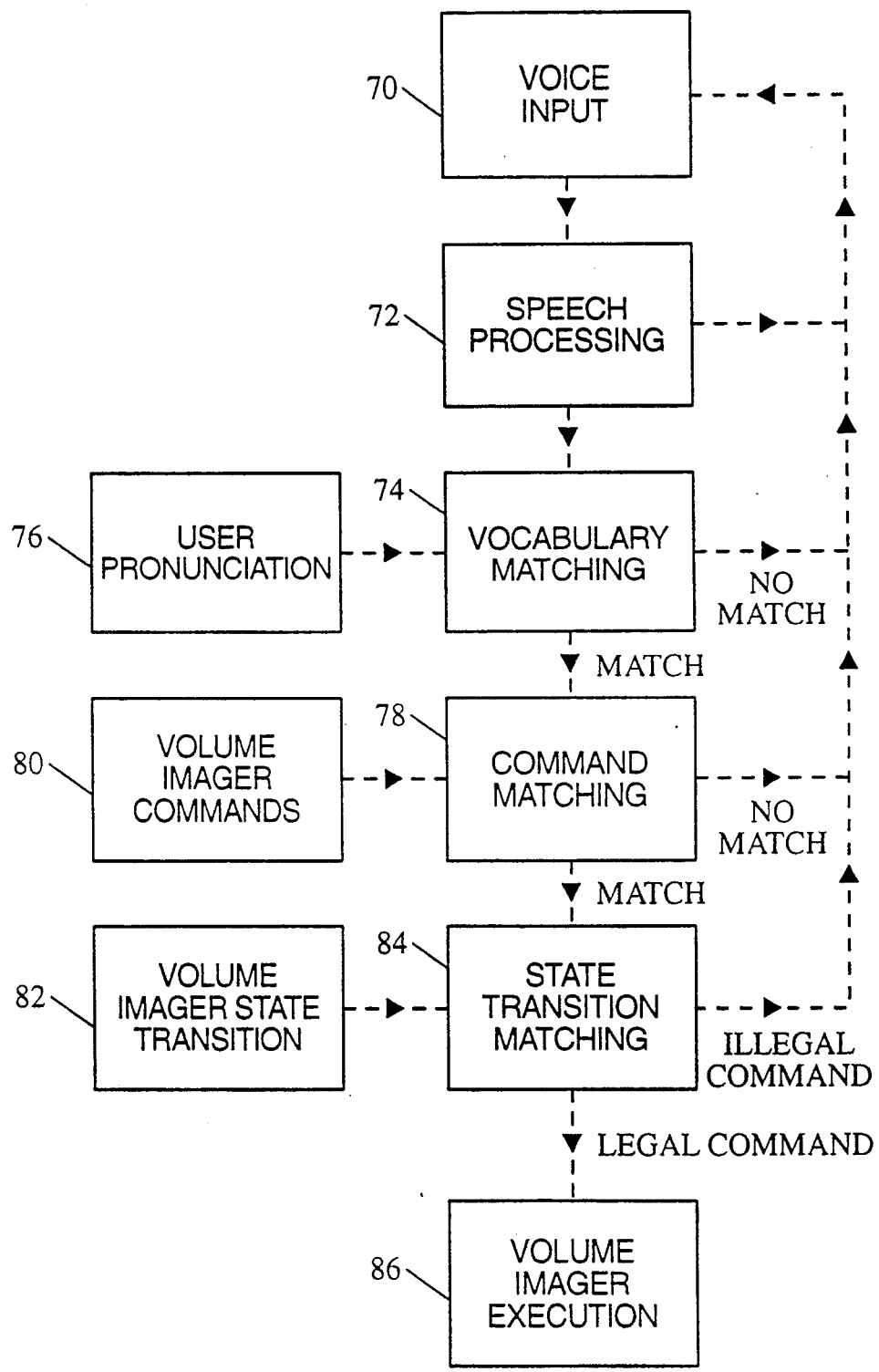
FIG. 4 is a flow chart illustrating the operation of the present invention.

With reference to FIG. 4, an audio speech pattern is converted 70 to an electrical speech signal. The electrical speech signal is processed 72 and matched 74 to a user pronunciation dictionary or list 76 to ascertain a corresponding valid English (or other language) word. Each valid word is matched 78 with a list so of valid command words. Normally, each valid command is only executable when the system is in proper state. The current state of each system component, the valid command, and the proper state(s) 84 for the received valid command are matched 84 to determine if the received command is timely or "legal". If the command is legal, the command is executed 86 to cause commencement and/or termination of the appropriate action by the volume imager or other selected system components.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An operating room hands free medical diagnostic image display and recording system comprising:
   a receiving means for receiving acoustic voice sounds spoken by a surgeon during an operating room procedure and converting the acoustic voice sounds into electrical audio signals;
   a speech processor means for converting the electrical audio signals into electrical word signals indicative of words;
   a command interpreter means for converting selected ones of the electrical word signals which correspond to preselected command words into corresponding command signals;
   a volume imager which stores image data corresponding to a preselected three dimensional volumetric region of a subject and for withdrawing a selected fraction of the stored image data corresponding to one of an orthogonal slice through the volumetric region, an oblique slice in the volumetric region, and a projection of at least a portion of the volumetric region in response to the command signals from the command interpreter means and generating corresponding image representation signals indicative of a selected slice or projection;
   a display means for converting the image representation signals from the volume imager means into a man-readable image display depicting a portion of the volumetric area of the patient such that the surgeon verbally calls up and controls the display of images to assist in the operating room procedure in progress;
   a recording means for recording at least one of: (i) the electrical audio signals from the receiving means, (ii) the word signals from the speech processor means, and (iii) the image representation signals from the volume imager means.

2. The system as set forth in claim 1 wherein the recording means includes a video recorder means for making a video recording from the image representation signals and an audio sound track recording from the electrical audio signals.

3. The system as set forth in claim 1 further including a printer means for making a paper text and image copy from the word signals from the speech processor means and the image representation signals from the volume imager means.

4. A hands free medical diagnostic image display system comprising:
   a means for receiving acoustic voice sounds and converting the acoustic voice sounds into electrical acoustic wave patterns;
   a speech processor means for converting the electrical acoustic waveforms into electrical word signals indicative of words;
   a command interpreter means for comparing the word signals from the speech processor with a list of valid command words including command words indicative of a request to display selected slices and projection, the command interpreter generating a corresponding command signal in response to each received word signal that matches one of the valid command words, in response to a command word indicative of the request to display one of a selected slice and a selected projection, the command interpreter generates a corresponding slice or projection command signal;

a volume imager means which stores image data corresponding to a preselected volumetric region of a subject and for generating image representation signals from a selected portion of the image data;

a system manager means which receives the command signals, in response to receiving the corresponding slice or projection command signal from the command interpreter means, the system manager controls the volume imager to generate image representation signals from the image data corresponding to the selected slice or projection;

a recording means operatively connected with the speech processor means and the command interpreter, the recording means responding to a corresponding command signal to record the electrical word signal from the speech processor means;

a display means for providing a human-readable display of the selected slice or projection from the image representation signals.

5. A hands free medical image display system comprising:

a means for receiving acoustic voice sounds and converting the acoustic voice sounds into electrical acoustic wave patterns;

a speech processor means for determining words which corresponds to each electrical acoustic wave patterns and generating electrical word signals indicative thereof;

a command interpreter means for converting selected ones of the electrical word signals into corresponding command signals, the command interpreter means including:

an input means for receiving the word signals from the speech processor;

a comparing means for comparing each received word signal with a list of valid command words in a valid command memory means, the list of valid command words including a command word for indicating display of a selected slice;

a command signal forming means for forming a command signal which corresponds to each received word signal which matches one of the valid command words;

a volume imager means which stores image data corresponding to a preselected volumetric region of a subject and for withdrawing selectable portions of the image data from a selected subregion of the volumetric region and generating image representation signals therefrom;

a system manager means which receives the command signals from the command interpreter means, in response to a command signal which corresponds to the command word indicating the selected slice, the system manager means controls the volume imager means to generate image representation signals depicting the selected slice;

a display means for converting the image representation signals from the volume imager means into a human-readable display.

6. The system as set forth in claim 5 further including an audio recording means operatively connected with the receiving means for recording the electrical wave patterns.

7. The system as set forth in claim 5 further including a video recorder means for recording the image representation signals.

8. The system as set forth in claim 7 wherein the video recording means is connected with the receiving means for concurrently recording at least portions of the electrical acoustic wave patterns with the image representation signal.

9. The system as set forth in claim 7 further including a hard copy printing means operatively connected with at least one of the volume imaging means and the video recorder means for selectively providing a print of a selected image representation.

10. The system as set forth in claim 9 further including a text means operatively connected with the speech processor for converting electrical word signals into text that is printed by the hard copy means, whereby a textual description can be printed accompanying each printed image.

11. The system as set forth in claim 5 wherein the command interpreter means further includes:

a checking means for checking whether the volume imaging means is in an appropriate state to respond to each command signal received from the command signal forming means.

12. The system as set forth in claim 11 wherein the command interpreter further includes:

a validity checking means for checking validity of the word signals received from the speech processor.

13. The system as set forth in claim 12 wherein the command interpreter means further includes:

a feed back means for generating a feed back signal indicative of at least one of the validity of the received word signal and the state of the volume imager.

14. The system as set forth in claim 13 further including:

a voice synthesizer for converting the feed back signal into spoken words.

15. A hands free medical diagnostic image selection and display system comprising:

a means for receiving acoustic voice sounds and converting the acoustic voice sounds into electrical audio signals;

a means for digitizing the audio signals;

an audio signal comparing means for comparing each digitized audio signal received from the audio signal digitizing means with a list of authorized digitized audio signals in a library memory means, the library memory means storing a digital word signal in conjunction with each authorized digitized audio signal of the list, the audio signal comparing means outputting the digital word signals;

a digital word signal comparing means for comparing each received digital word signals with a list of valid command words in a valid command memory means, the list of command words including command words directing a display of selected slice and projection images;

a command signal means for forming a command signal in response to the digital comparing means matching one of the received digital word signals to one of the valid command words in the list, which formed command signal corresponds to the one of the valid command words that the received digital word signal matches;

a volume imager means which stores image data corresponding to a preselected volumetric region of a subject and for withdrawing selectable portions of the image data in response to the command signals received from the command signal means and generating corresponding image representation signals corresponding to portions of the image data indicated by the command signals from the command signal means;

a system manager means for controlling the volume imager means to generate image representation signals corresponding to the portions of the image data indicated by command signals received from the command signal means, in response to received command signals corresponding to command words directing the display of one of (1) a selected slice image and (2) a selected projection image, the system manager means controls the volume image means to generate image representation signals depicting the selected one of the selected slice and projection images;

a display means for converting the image representation signals from the volume imager means into a human readable display.

16. The system as set forth in claim 15 wherein the library memory means further stores a language code in conjunction with each of the authorized digitized audio signals such that the audio signal comparing means further outputs the corresponding language code, each language code designating one of a plurality of preselected languages.

17. The system as set forth in claim 16 further including:
   a feed back means for providing a feed back information signal indicative of at least one of a status of the volume imager, a validity of the received digital word signal, and completeness of the command signal;
   a voice synthesizer for converting the feed back information signal into a human understandable speech;
   a speech synthesizer control means for controlling the speech synthesizer to speak in one of a plurality of preselected languages, the speech synthesizer control means being operatively connected with the library memory means such that the language code controls into which of the plurality of preselected languages the fed back information signal is converted.

18. A method of displaying medical diagnostic images, the method comprising:
   converting spoken words into audio signals;
   converting each of the audio signals into one of a plurality of word signals indicative of a corresponding word;
   comparing each word signal with a library of preselected command words;
   in response to matching the word signal with one of the preselected command words, generating a corresponding command;
   controlling a volume imager in accordance with a command signal indicative of one of a selected planar slice through the volumetric image data and a selected projection of volumetric image data stored in the volume imager to retrieve a portion of the volumetric image data corresponding to the selected planar slice or projection, the volumetric data being indicative of an internal region of a patient;
   converting the retrieved portion of the volumetric image data into a human readable display of the selected slice or projection of the internal patient region.

19. The method as set forth in claim 18 further including converting the image representation signal into a man-readable display.

20. The method as set forth in claim 18 further including:
   recording spoken words;
   playing back the recorded spoken words; and
   wherein the step of converting spoken words into audio signals includes converting the played back spoken words into the audio signals.

* * * * *